United States Patent

Dai

(10) Patent No.: US 8,047,599 B2
(45) Date of Patent: Nov. 1, 2011

(54) AUTOMOBILE AND SUN VISOR THEREOF

(75) Inventor: Lung Dai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/853,294

(22) Filed: Aug. 10, 2010

(65) Prior Publication Data

US 2011/0227361 A1    Sep. 22, 2011

(30) Foreign Application Priority Data

Mar. 18, 2010   (TW) ............................... 99107972 A

(51) Int. Cl.
*B60J 3/00* (2006.01)
(52) U.S. Cl. ...................................... 296/97.5; 296/97.1
(58) Field of Classification Search ................. 296/97.1, 296/97.5; 455/145, 152.1, 345, 347, 566
See application file for complete search history.

(56) References Cited

U.S. PATENT DOCUMENTS

| | | | |
|---|---|---|---|
| 5,871,251 A * | 2/1999 | Welling et al. ............... 296/97.5 |
| 6,714,327 B1 * | 3/2004 | Abersfelder et al. ........... 359/13 |
| 6,947,071 B2 * | 9/2005 | Eichmann ..................... 348/142 |
| 7,019,794 B2 * | 3/2006 | Norvell et al. ................ 348/838 |
| 7,070,237 B2 * | 7/2006 | Rochel ........................ 297/217.3 |
| 7,769,342 B2 * | 8/2010 | Tabe ............................ 455/3.06 |
| 2003/0137584 A1 * | 7/2003 | Norvell et al. .................. 348/61 |
| 2006/0047375 A1 * | 3/2006 | Eichmann ........................ 701/1 |
| 2006/0181514 A1 * | 8/2006 | Newman ....................... 345/168 |
| 2009/0092284 A1 * | 4/2009 | Breed et al. ................... 382/103 |
| 2009/0168185 A1 * | 7/2009 | Augustine ..................... 359/613 |
| 2010/0053723 A1 * | 3/2010 | Varaprasad et al. .......... 359/267 |
| 2010/0254014 A1 * | 10/2010 | Trinh et al. ................... 359/601 |

* cited by examiner

*Primary Examiner* — Lori Lyjak
(74) *Attorney, Agent, or Firm* — Altis Law Group, Inc.

(57) ABSTRACT

A sun visor includes a main body, a television module, a display and a solar panel. The television module is located in the main body to receive television signals and reproduce audio and video. The display is positioned on a first side of the main body to display video based on the video signals. The solar panel is positioned on a second side of the sun visor boy to receive and convert sun light into electric energy to supply power to the television module and the display.

9 Claims, 4 Drawing Sheets

AUTOMOBILE AND SUN VISOR THEREOF

BACKGROUND

1. Technical Field

The present disclosure relates to an automobile, and particularly to a sun visor used in the automobile.

2. Description of Related Art

It is common for automobiles to come installed with electronic devices such as a television and media player. However, the electronic devices can take up considerable space.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The present disclosure provides an automobile with a sun visor incorporating a television function. Furthermore, the present disclosure utilizes renewable energy, such as solar energy, to power the sun visor for operating a television.

Figure 1:
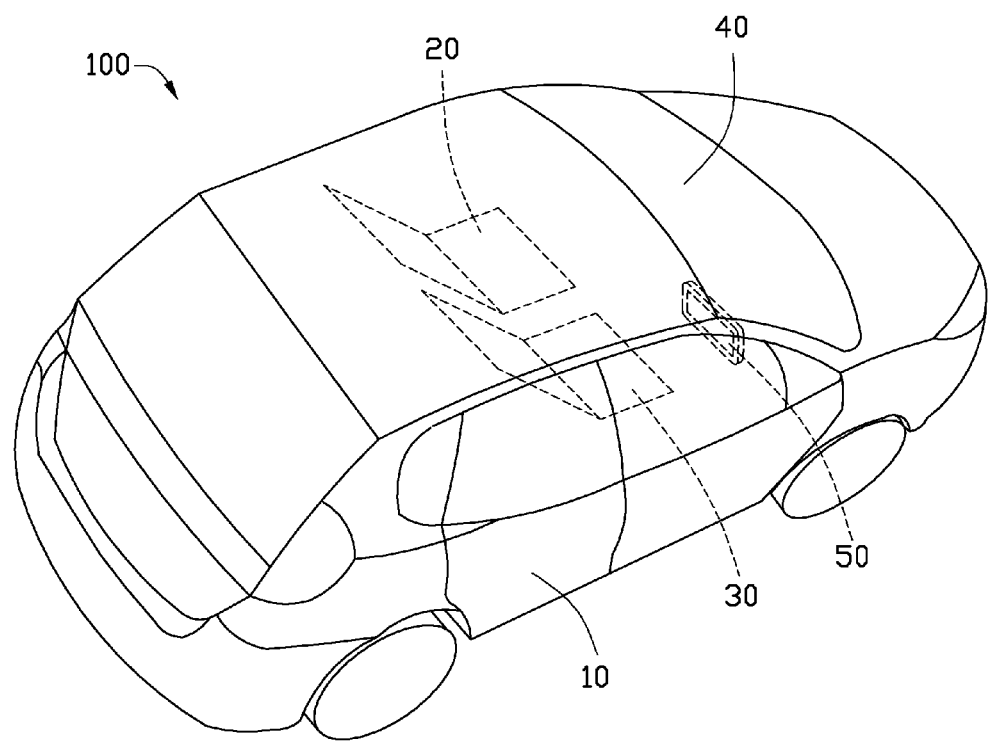
FIG. 1 is a schematic view of an automobile with a sun visor in one state in accordance with an exemplary embodiment.
Figure 2:
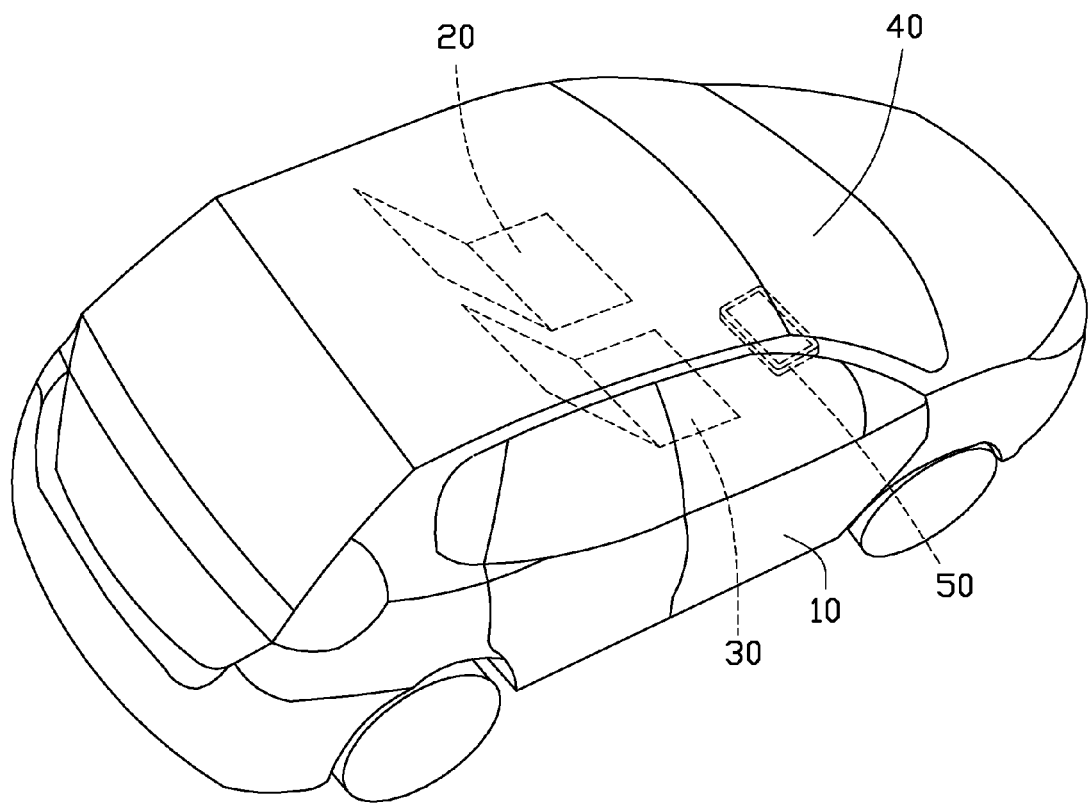
FIG. 2 is a schematic view of the automobile in FIG. 1 with the sun visor in another state in accordance with an exemplary embodiment.

Referring to FIGS. 1 and 2, an automobile 100 is illustrated. The automobile 100 includes an automotive body 10, a driver side seat 20, a front passenger seat 30, a front windshield 40, and a sun visor 50. The driver side seat 20 and the passenger seat 30 are arranged side by side in the front of the automotive body 10. The sun visor 50 is rotatably attached at or near the top of the windshield 40 for use by an occupant of the passenger seat 30.

Figure 3:
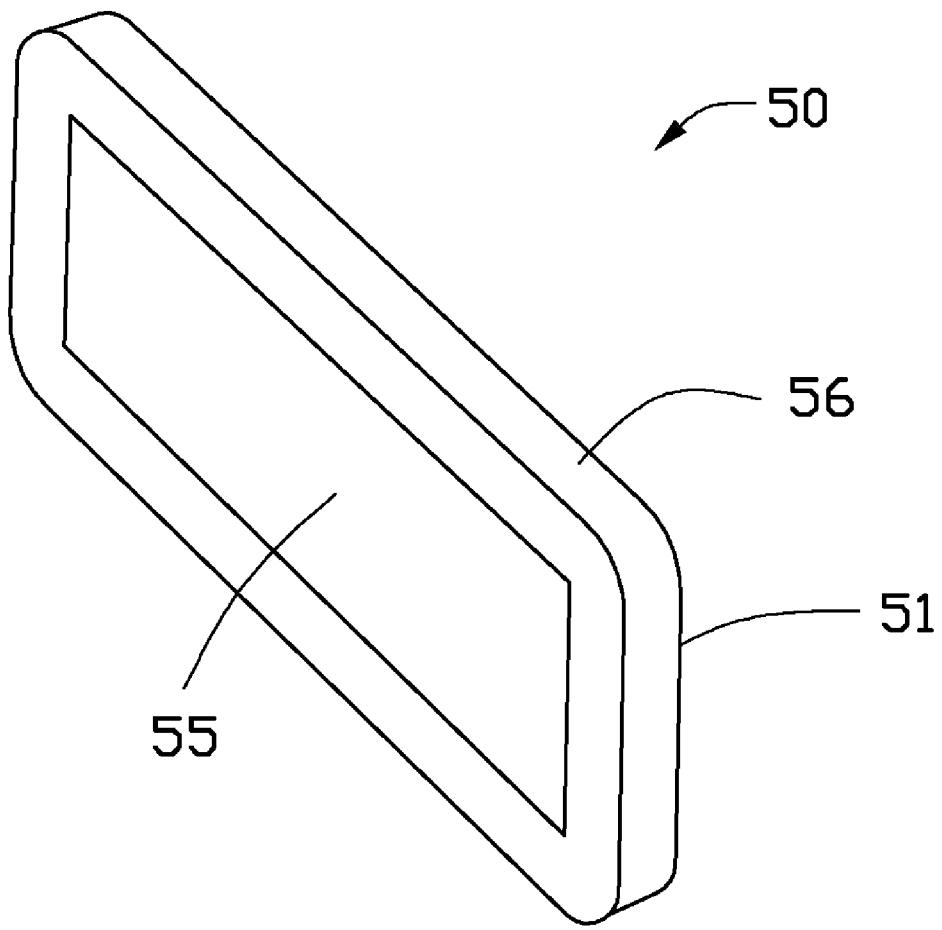
FIG. 3 is a schematic view of the sun visor in FIG. 1 in accordance with an exemplary embodiment.
Figure 4:
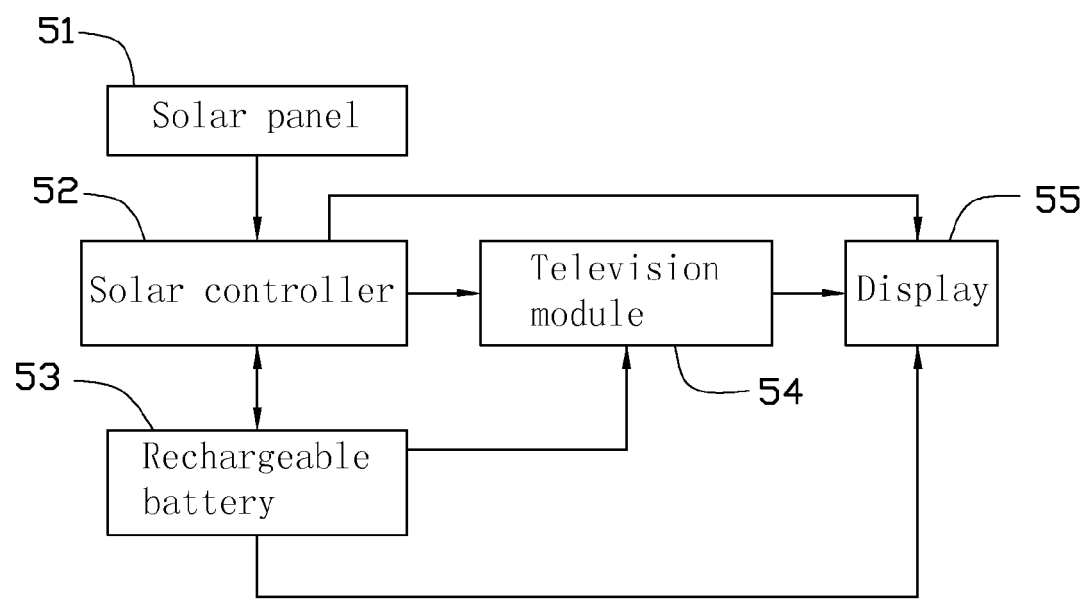
FIG. 4 is a function block diagram of the sun visor in FIG. 1 in accordance with an exemplary embodiment.

Referring to FIGS. 3 and 4, the sun visor 50 can be rotated with respect to the windshield 40 to be selectively located at a first position, and a second position. The sun visor 50 includes a main body 56, a solar panel 51, a solar controller 52, a rechargeable battery 53, a television module 54, and a display unit 55. The main body 56 is substantially rectangular. The solar panel 51 and the display 55 are arranged on opposite sides of the main body 56. If the sun visor 50 is in the first position, the display 55 is viewable by the occupant of the passenger seat 30 and the solar panel 51 faces the windshield 40. The solar controller 52, the rechargeable battery 53, and the television module 54 are arranged in the main body 56.

The television module 54 can receive television signals and decode the received television signals to reproduce video and audio. The video is displayed by the display 55. The display 55 may be an LCD display or a LED display for example. The solar panel 51 receives and converts sunlight to electric energy. The solar controller 52 is electrically connected to the solar panel 51, and configured to store the electric energy in the rechargeable battery 53. The rechargeable battery 53 is configured to supply electric power to the television module 54 and the display 55. Furthermore, in anther embodiment, the solar controller 52 can supply electrical power directly to the television module 51 and the display 55.

Besides allowing a passenger to watch a solar powered TV, when the sun visor 50 is in the first position, the sun visor 50 functions as a common visor to block sunlight from shining into the face of the occupant of the passenger seat 30, and of course, when the visor is not needed it can be easily rotated up to the second position.

As described above, the sun visor 50 of the automobile 100 is multifunctional and incorporates a solar powered television, saving space that would otherwise be occupied by the television in another location of the automobile 100. Further, the sun visor 100 utilizes a renewable resource, sunlight, to supply power to the television module 54 and the display 55.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A sun visor used in an automobile having a front windshield, comprising:
    a main body comprising a first side opposite to the front windshield of the automobile and a second side opposite to the first side;
    a television module located in the main body, the television module adapted to receive television signals and reproducing audio and video corresponding to the received television signals;
    a display positioned on the first side of the main body to display video; and
    a solar panel positioned on the second side of the main body to receive and convert sun light into electric energy to supply power to the television module and the display.

2. The sun visor according to claim 1, further comprising a solar controller, the solar controller being configured to input the electric energy to the television module and the display.

3. The sun visor according to claim 1, further comprising a solar controller and a rechargeable battery, the solar controller being configured to store the electric energy in the rechargeable battery, the rechargeable battery being configured to supply power to the television module and the display.

4. An automobile comprising:
    a front windshield;
    a sun visor arranged adjacent to the front windshield and being adaptive to blocking sun light entering into the automobile, the sun visor comprising:
    a main body comprising a first side opposite to the front windshield and a second side opposite to the first side;
    a television module located in the main body, the television module configured to receive television signals and reproducing audio and video corresponding to the received television signals;
    a display positioned on the first side of the main body to display video; and
    a solar panel positioned on the second side of the main body to receive and convert sun light into electric energy to supply power to the television module and the display.

5. The automobile according to claim 4, further comprising a solar controller, the solar controller being configured to input the electric energy to the television and the display.

6. The automobile according to claim 4, further comprising a solar controller and rechargeable battery, the solar controller being configured to store the electric energy in the rechargeable battery, the rechargeable being configured to supply power to the television module and the display.

7. The automobile according to claim 4, wherein the sun visor being rotatably attached at or near the top of the front windshield to block sun light entering through the front windshield, and the sun visor capable of rotating from a first position being folded to a second position being unfold to block sun light entering through the front windshield.

8. The automobile according to claim 7, wherein the automobile further comprise a front passenger seat, when the sun visor located in the first position, the sun visor is placed between the windshield and the front passenger seat, and the solar panel faces to the windshield, and the display faces to the front passenger seat.

9. The automobile according to claim 8, wherein when the sun visor located in the second position, the sun visor is rotated up within proximity to the top of the front windshield.

* * * * *